March 8, 1932.   W. B. EDDISON   1,848,520
MOVEMENT CHECKING MACHINE
Filed Sept. 1, 1927   3 Sheets-Sheet 1

INVENTOR.
William Barton Eddison.
BY
Andrew H Neureuther
ATTORNEY.

March 8, 1932. W. B. EDDISON 1,848,520
MOVEMENT CHECKING MACHINE
Filed Sept. 1, 1927 3 Sheets-Sheet 2

INVENTOR.
William Barton Eddison.
BY
Andrew H Neureuther
ATTORNEYS.

Patented Mar. 8, 1932

1,848,520

UNITED STATES PATENT OFFICE

WILLIAM BARTON EDDISON, OF ARDSLEY ON HUDSON, NEW YORK, ASSIGNOR TO WESTERN CLOCK COMPANY, OF PERU, ILLINOIS, A CORPORATION OF ILLINOIS

MOVEMENT CHECKING MACHINE

Application filed September 1, 1927. Serial No. 216,915.

My invention relates to movement checking machines and has for its object the production of a means whereby a light source or a beam of light is produced at predetermined uniformly spaced intervals of time and the moving object whose rate of motion is to be ascertained or checked is placed in the path of said light source to ascertain the relative difference in rate or synchronism of the light beam and the motion of said moving object. A further object is the production of such a machine having readily controlled means for decreasing or increasing the time interval between the flashes or beams of light to bring them into synchronism with the motion of said moving part. A further object is the production of such a machine in which the moving object can be so rated as to bring it into synchronism with the flashes or beams of light.

A further object is the production of a machine of this type that is extremely accurate and dependable and yet very simple in operation, entirely eliminating the usual severe eye strain consequent upon an observer watching two moving objects at the same time as for instance is done in the rating of time pieces where the observer compares the moving balance with the motion of a standardized balance, or the coil of the hair spring attached to the balance to be rated with a similar spring actuated by another balance or some device capable of giving said spiral spring a similar standardized motion. It is well known that the above mentioned eye strain is a very serious matter as only a small percent of persons tried out for this work qualify as trained operators and the trained operators can only do a limited amount of work per day and gradually, even these trained workers, leave the work of rating said balances for the less exacting work in other lines. The same may be mentioned in regard to rating by the sense of hearing, where one sound is brought into synchronism with sound from another sounding device. It also requires a trained operator with keen sense of hearing and it similarly causes undue nervous strain on the operator in time and the operation must be practiced in individual noiseless quarters for each operator. With my invention no skilled or trained operator is necessary and no keen sense of either sight or of hearing is required and the nervous states instituted because of the exact requirements necessary are entirely eliminated. Any ordinary person can operate my machine.

I attain the above by the mechanism shown in the accompanying drawings in which.

Similar parts are shown by the same numerals through the several views.

Figure 2:
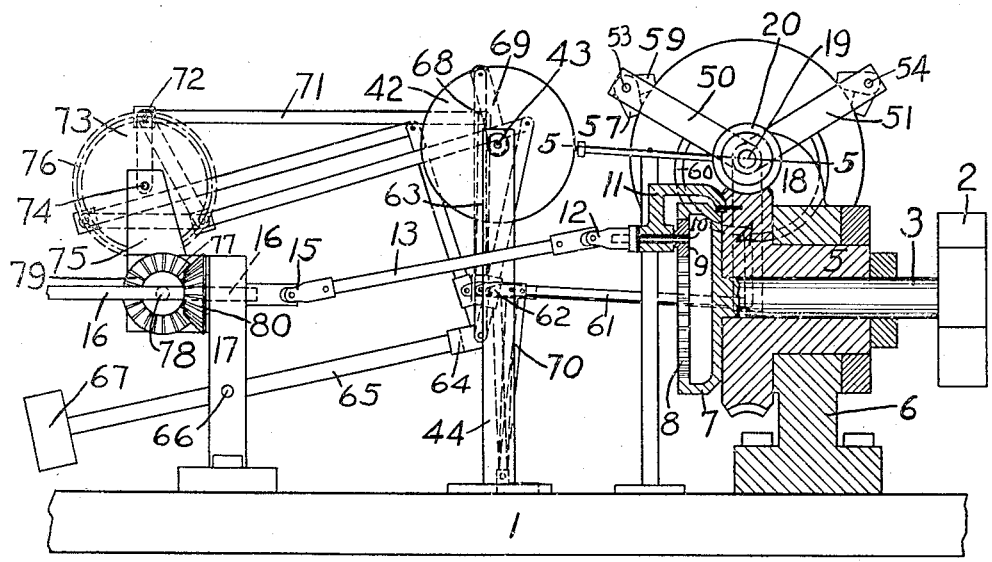
Fig. 2 is a side view of my invention showing a partial section in general along a line 2—2 of Fig. 1 with linkage mechanism in upper position with the exception that the pinion of the planetary drive is shown 90 degrees ahead (in vertical plane instead of horizontal plane) of position shown in Fig. 1, but the same position as shown in Fig. 3.
Figure 1:
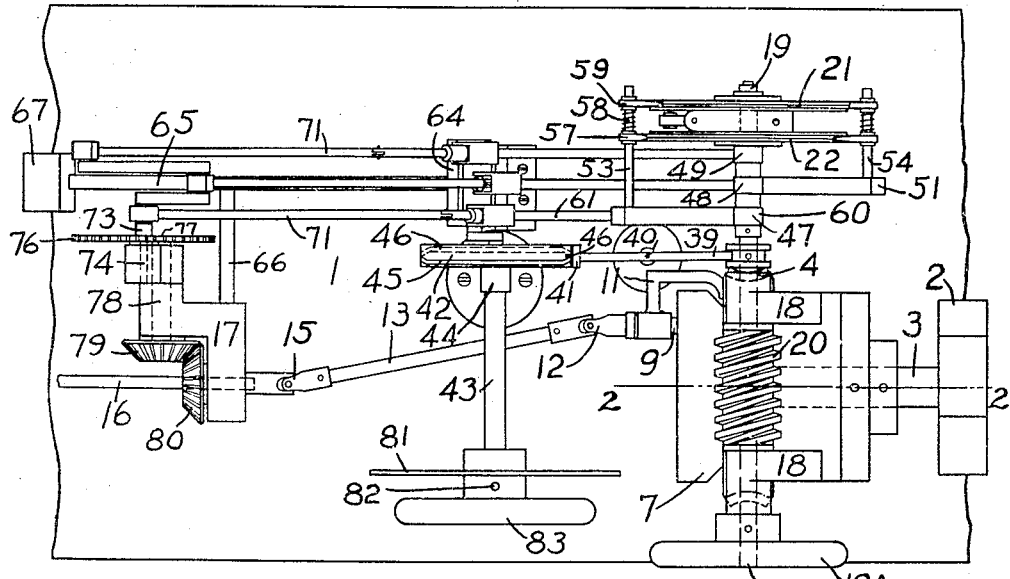
Fig. 1 is a top view on my invention not showing the optical devices which form a part of it.

In the drawings 1 represents the base of my movement checking machine, 2 is a mirror or reflector member preferably having a plurality of faces or reflecting surfaces as shown which is mounted on shaft 3 (see Fig. 2) journaled concentrically in a worm wheel 4 having an extension or hub 5 which is journalled in a frame 6 which is fastened to base 1 by means of the bolts shown. Worm wheel 4 is held in position by means of the collar shown on its hub 5. Formed on the end of shaft 3 is a cup shaped part 7 having internal gear teeth 8 cut in the annular opening at its left hand end as shown and forming one member of a planetary gear system whose function will be explained below. The shaft 3 is held in position by means of the collar mounted on it as shown. Meshing with internal gear teeth 8 is a pinion 9 which is mounted on a shaft 10 which is journaled in a bracket 11 which is fastened to the worm wheel 4 as shown (see Fig. 2). Fastened on shaft 10 is a universal joint 12 as indicated which is attached to a shaft 13 with a similar universal joint 15 which is fastened to a shaft 16 which is journaled in a standard 17 fastened to base 1 by means of the bolts shown. The shaft 16 is driven by any mechanical or electric means capable of giving a constant uniform angular rotation and it is evident that as long as the worm gear 4 is held stationary that the shaft 3 will have a constant uniform angular rotation in amount for a given space of time dependent upon the ratio of the internal gear teeth 8 and the teeth in the pinion 9, and the number of uniformly spaced flashes of light or light beams given during a period of time will depend on the number of rotations of the shaft 3 and the number or reflecting faces on mirror or reflecting member 2.

Figure 5:
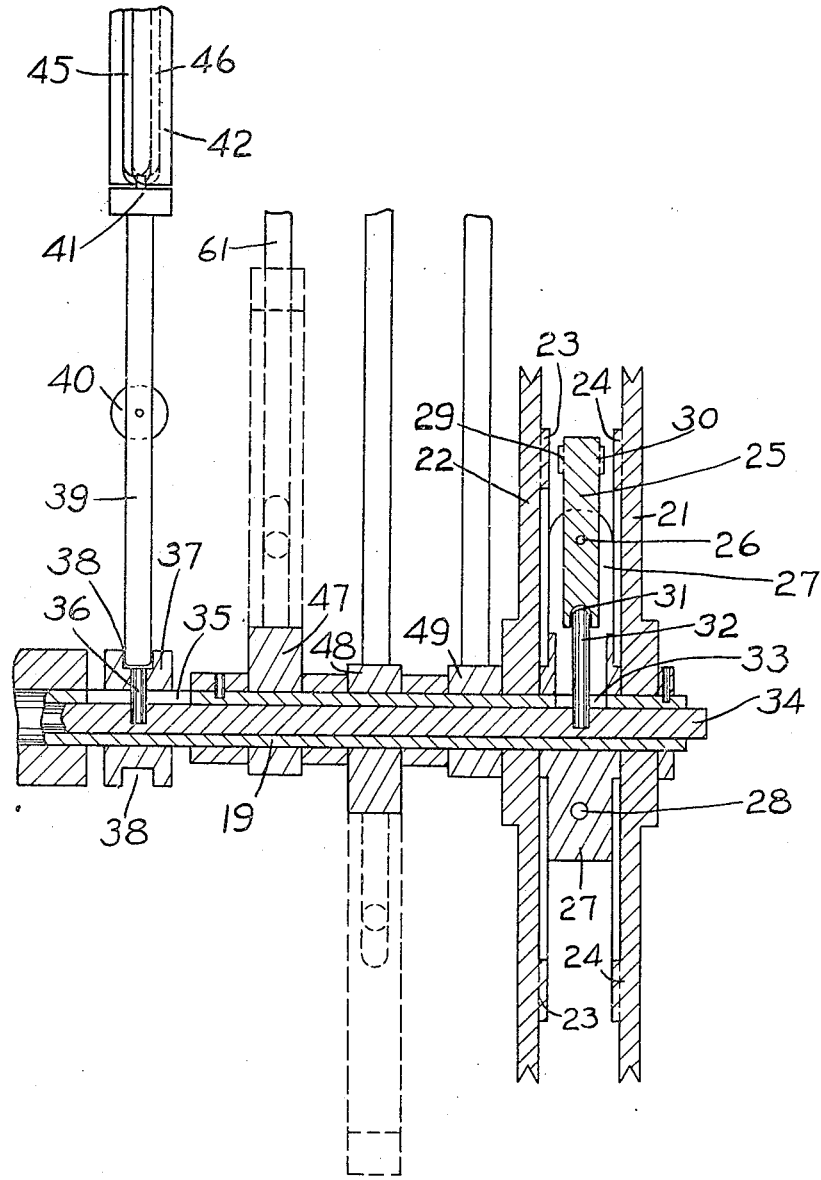
Fig. 5 is an enlarged cross sectional view along a line 5—5 of Fig. 2.

Journally mounted in a bracket 18 fastened on frame 6 is shaft 19 on which is fastened a worm 20 which meshes into and actuates the worm wheel 4. It is evident that rotating the shaft 19 in one direction will rotate worm wheel 4 in one direction and rotating the shaft 19 in the opposite direction will rotate 4 in the opposite direction and pinion 9 being mounted in bracket 11 fastened to worm wheel 4 will move with it either increasing or decreasing its relative position on internal gear teeth 8 thereby increasing or decreasing the speed of the shaft 3 attached to internal gear 8 above mentioned and all of which is well known as the function of the planetary gear system thus formed and preferably used in my invention. From the above description it is evident that by properly rotating the shaft 19 the space of time occupied by the mirror or reflecting faces passing a given point can be reduced or increased over that communicated by means of the shaft 16 above mentioned alone, which speed when not influenced by the worm 20 I choose to call the "standard rate or speed". The shaft 19 can be rotated clockwise or anti-clockwise having a neutral point where it will remain stationary by using any of the usual forward and reverse mechanisms that are positive in action and uniform in motion. I prefer to use a plurality of the modified link motions whereby the motion is derived from a multiple throw crank with an adjustable mechanism in the linkage whereby the motion transferred can be made to vary from a minimum to a maximum and said motion is communicated to disk having friction pawls that rotate one disk in forward direction on the stroke of the crank and similar pawls that rotate a similar disk in the reverse direction, both of said disks being rotatably mounted on the shaft 19 of the worm 20, the disks 21 and 22 being rotatably mounted and positioned on said shaft 19, as shown (see Fig. 5). Disk 22 has an angular ring of clutch teeth 23 mounted upon it and disk 21 has an angular ring of clutch teeth 24 mounted on it, which can be engaged by a clutch arm 25 pivotally mounted by means of a pin 26 in slotted bracket 27 rigidly fastened to shaft 19 by means of screw 28. Clutch arm 25 has clutch teeth 29 formed on its upper left hand portion which can engage with the teeth 23 on disk 22 and also has clutch teeth 30 which can engage with the clutch 24 on the disk 21. The lower part of clutch arm 25 has a U-shaped opening 31 which retains a pin 32 which pin passes through a slotted aperture 33 in the shaft 19 and is fastened in a shaft 34 which shaft is slidably and concentrically mounted in the center of the shaft 19 as shown. The shaft 34 extends to the left sufficiently to pass beyond the aperture 35 in said shaft 19 and a pin 36 fastened in shaft 34 projects through said aperture 35 and into the collar 37 which is slidably mounted on shaft 19. Collar 37 has a depressed part 38 into which is loosely mounted on one end of a lever 39 which lever is pivoted to a post 40 mounted on base 1. The other end of lever 39 is suitably shaped as shown at 41 and engages a cam 42 mounted on a shaft 43 which is journaled in a post 44 fastened to base 1. Cam 42 has two parallel lobes 45 and 46 but which are spaced apart and connected on a similar cam part so that end 41 of lever 39 can pass from one lobe to the other lobe thereby moving the lever 39 sideways and sliding collar 37 along the shaft 19 with results above mentioned of engaging or disengaging the respective teeth on clutch arm 25 and the teeth 23 and 24 on the disks 22 and 21 respectively. It is evident that when the end of lever 39 is at a point equidistant between the two lobes 45 and 46 of the cam 42 that collar 37 is in its central position such that the clutch arm 25 is not engaged with the teeth of either disk 21 or 22 and therefore the shaft 19 is entirely stationary and the minor surfaces are operating at the "standard rate or speed". It is further evident that when collar 37 is moved to either side of this central position by virtue of end of lever 39 being either on lobe 45 or lobe 46 of the cam 42 that the clutch arm 25 will be controlled by the respective disk 23 or 24 and the shaft 19 rotated accordingly.

Journally mounted on shaft 19 is a plurality of members shown as 47, 48 and 49 having the levers 50 and 51 and 52 each having a shaft 53, 54 and 55 respectively fastened thereto as shown. Journaled on shaft 53 and resiliently controlled thereon by means of a spring 58 is a pawl 57 which presses against and in the groove shown in the outer surface of the disk 22 and when lever 50 is moved in a counter clock-wise direction the disk 22 will be rotated with it in the counter clock-wise direction and when it moves in the clockwise direction the pawl 57 will slide over the grooved surface and not rotate the disk 22. Similarly mounted on 53 is a pawl 59 which is held against and in the groove shown in the disk 21 by means of a spring 58 in such manner that when lever 47 is rotated in a clock-wise direction the disk 21 will be rotated in the clock-wise direction with it and when the arm 47 rotates in the counter clock-wise direction the pawl 59 slides over the grooved surface of the disk 21 without rotating it. It will thus be seen that by these means the shaft 19 and worm wheel 20 can have forward and reverse motion and can remain stationary and this function will be referred to further along. The levers 51 and 52 are made up the same and perform the same function as the lever 50, the plurality of these aid in giving a steady motion to the disks 22 and 21.

Figure 3:
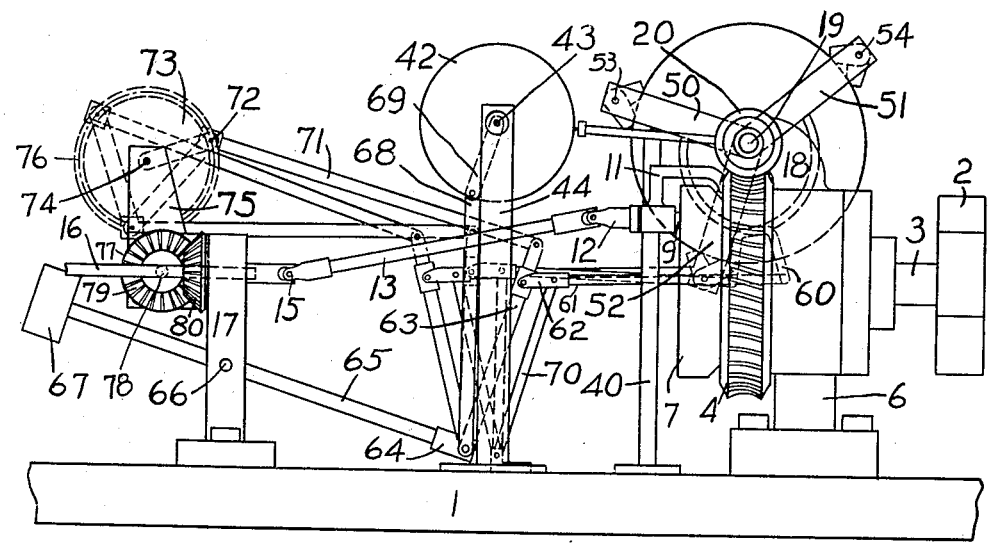
Fig. 3 is a side view of Fig. 1, shown with the linkage mechanism shown in its lower position.

Lever 50 receives reciprocating motion through an arm 60 projecting from its lower portion being pivotallly connected to one end of a link 61 whose other end is pivotally connected to a block 62 which is slidably mounted on a vertically positioned link 63 which link 63 is pivoted in link block 64 which is pivotally connected with a link arm 65 which is journaled on a pin 66 in bracket 17 above mentioned and link arm 65 is extended beyond the pin 66 and has a counter weight 67 mounted on it to counter balance the link block 64 which is positioned and moved vertically by means of a link 68 pivotally connected to said link block 64 at the lower end of said link 68 and the crank arm 69 pivotally connected to the upper end of link 68. Arm 69 is fastened to the shaft 43 above mentioned and is shown adjacent to its highest operating position in Figure 2 and its lowest operating position in Figure 3. The position of link 61 is further restrained and controlled by means of a link 70 being pivotally connected on its upper end to 62 and pivotally connected to the base 1 at its lower end and it is evident that link 61 being part of a parallel motion linkage can practically only move forward and backwards in a horizontal plane.

The upper end of link 63 is pivotally connected to one end of a connecting rod 71 whose other end is journaled on the crank pin 72 of crank disk 73 which crank pin 72 is one of a plurality of crank pins that operates a plurality of linkages same as that just above described and as shown. Crank disk 73 is fastened to a shaft 74 which is journaled in a bracket 75 which is mounted on the standard 17 as shown. The outer edge of crank disk 73 has gear teeth 76 formed on it which engage the teeth of a pinion 77 immediately below the crank disk 73. Pinion 77 is mounted on a shaft 78 which is journaled in an extending part of the bracket 17 and carries a bevel gear 79 which meshes with a bevel gear 80 which is mounted on the shaft 16 above mentioned and is the means by which the entire linkages above described are driven. The arm 69 on shaft 43 is so positioned in relation to the cam 42 mounted on said shaft 43 so that when the arm 69 is in its upper (highest) vertical position that the lever 39 is in between the lobes 45 and 46 of said cam 42 and it is evident from the above description and from Figure 2 that in this position of the linkage that there is practically no forward or backward motion of the link 61 and also that the clutch arm 25 will be in its central or neutral position or as I choose to call it the zero position at which position the mirrors on 2 will have only the motion due to the shaft 16 and a dial plate 81 is placed adjacent to shaft 43 and has a pointer 82 and a hand wheel 83 mounted on the shaft 43 by means of which the position of arm 69 can be brought to the right or left of its highest vertical position to increase or decrease the "standard" time interval with which the mirrors will pass a given point because of the increased motion given to link 61 as block 64 is lowered (see Fig. 3) and thus enable the operator to bring the mirror surface or a ray of light from the mirror surface into synchronism or beat with the motion of the moving body, whether it be motion of translation, a rotary motion or an oscillating motion and the dial 81 can be graduated to indicate the total variation from the required standard for a given period.

Shaft 19 has a hand wheel 19A mounted on it by means of which an independent rotation can be given worm 20 by hand in either direction to advance or retard the motion of the mirror surface, or the beam of light from it, to bring it into unison or beat with the motion of the movement to be checked giving a proper starting point for the checking operation itself.

Figure 4:
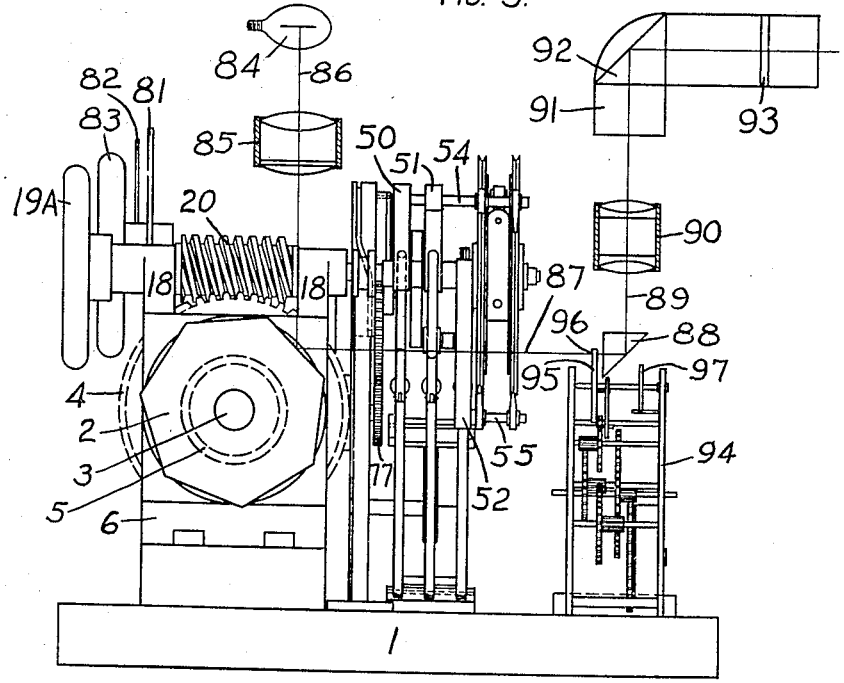
Fig. 4 is a front view of my invention showing it complete with optical devices that may be used with it.

Among other methods of utilizing my movement checking machine I use one arranged as indicated in Fig. 4 of the drawings in which 84 indicates suitable source of light mounted adjacent to the mirror or reflecting system 2 and 85 is a suitable lens system to bring the light beams indicated by 86 on to said system 2 which reflects them as indicated at 87 into a glass prism 88 which reflects the light beam as indicated at 89 through another lens system indicated at 90 thence to closed chamber member 91 where another prism 92 brings the light beams to a screen 93 before the eyes of the observer as indicated.

In operation with the mechanism arranged as above described, I place and fasten a clock movement 94 on the base 1 as shown in Figure 4 so that its balance wheel 95 comes in the path of the light beams 87 either so a spoke of the wheel or a projection on same or preferably an aperture 96 in the rim or spoke of the wheel either interrupts the beam of light or permits it to pass through and shows either the shadow of the spoke dividing the light source or the beam of light through the aperture, by means of the light system indicated, on the screen 93 in front of the eyes of the observer.

The wheel 95 is stopped and the hand wheel 19A is rotated to position the light beams to bring the image well within the boundary of the screen 93 when the wheel 95 is permitted to resume its motion and it is evident that if the motion of the wheel is in synchronism with the projected beams of light or conversely, if the motion of the projected beam of light is in synchronism with the motion of the wheel the projected image will appear stationary and in the same place with the same characteristics on the screen.

However, if the motion of the beam of light is faster or slower than the motion of the wheel, the projected image will move across the screen, advancing forward or moving backward as the case may be, and then to bring the light beam into synchronism with it to determine the amount of time required to bring the beams of light into synchronism with the motion of the wheel, the hand wheel 83 is moved in the proper direction that is indicated by the projected image on the screen until the motion of the beam of light is in synchronism with the motion of the wheel 95 as indicated on the screen 93 as above mentioned, when the amount of error and whether fast or slow can be read directly from the properly graduated dial plate 81 by means of the indicator hand 82 when the movement can be accepted if within the limits of error allowable. If not within the limits of error allowable, the movement can be re-rated by turning the pointer 82 back to zero on dial 81 or the neutral point on the cam 42 above mentioned where the mirror faces revolve at the standard rate or speed of the machine and the movement to be checked is adjusted with the light beams, for instance in the clock movement shown, the motion of the balance wheel 95 is controlled by the hair spring 97 and the operator can use a pair of tweezers and grasp the end of the hair spring, then pull the usual hair spring locking wedge with a pair of pliers and shorten the hairspring if the balance wheel does not oscillate fast enough to be in synchronism with the light beam flashes or lengthen the hair spring if the motion of the balance wheel is too fast for the light beam flashes and when the point of proper synchronism is reached, the wedge can be forced in again, the amount of the shortening or lengthening of the spring can be readily foretold after a little experience after first ascertaining the amount of error as above mentioned. From the above mentioned description, it is evident that my machine can be used either to check and ascertain the error in a movement already rated to learn the amount of adjustment necessary, or the given standard rate of the machine can be used and the moving object be adjusted so that it will be in synchronism with the projected light beams or flashes, of the standard rate of the machine.

It will be understood of course that while I have here shown one form of my invention, I do not wish to limit myself to the exact form shown and described but wish to have it taken in a sense illustrative of any and all the forms that come fairly within the scope of my claims.

I claim:

1. In a movement checking machine, means for producing a plurality of intermittently projected light beams at a predetermined standard rate, said means comprising a rotating polygonally faced mirror, a movably mounted member having an aperture positioned in the path of said light beams means for varying said rate from the standard rate associated with means, for indicating the relative difference in the said projected light beams above or below the motion of said moving member.

2. In a movement checking machine, means for positioning a pivotally mounted member having an aperture, means for producing a plurality of light beams at equal time intervals of a given standard rate in combination with means for decreasing or increasing said time intervals to bring said light beams into synchronism with the motion of said member by means of its aperture and means for indicating the relative difference in the rate of said member and the standard rate of said beams of light.

3. In an apparatus for finding the rate of a pivotally mounted member having an aperture, means for projecting light beams at a predetermined rate across the path in which said aperture travels, said means comprising a source of light and a polygonally faced mirror adjacent to said member in combination with means for bringing the light image of said aperture on a screen.

4. In an apparatus for determining the rate of a pivotally mounted member having an aperture, means for producing a plurality of light beams projected intermittently at a standard uniform rate across the path in which said aperture travels, associated means for varying the rate at which said beams are projected above or below said standard rate in combination with means for indicating said variation and with means for bringing the image of said lighted aperture on a screen.

5. In an apparatus for determining the rate of an oscillating member having an aperture, means for producing a plurality of light beams projected intermittently at a standard uniform rate across the path in which said aperture travels, said means comprising a source of light and a polygonally faced mirror adjacent to said oscillating member, associated means for varying the rate at which said beams are projected above or below said standard rate in combination with means for indicating said variation and with means for bringing the image of said lighted aperture on a screen.

6. In an apparatus for determining the rate of a moving member having an aperture, a light source, a rotatably mounted polygonally faced mirror adjacent to said light source, means rotating said mirror projecting light beams through the path of said aperture at uniformly rated intervals and a screen associated therewith, with means for bringing the image of said lighted aperture on said screen.

7. In an apparatus for determining the rate of an oscillating member having an aperture, a light source, a rotatably mounted polygonally faced mirror adjacent to said light source, means rotating said mirror projecting light beams through said aperture at a selected point at uniformly rated intervals and a screen associated therewith, with means for bringing the image of the resultant lighted aperture on said screen.

W. BARTON EDDISON.